(12) United States Patent
Birdwell et al.

(10) Patent No.: US 6,203,483 B1
(45) Date of Patent: Mar. 20, 2001

(54) METHOD FOR SOLVENT EXTRACTION WITH NEAR-EQUAL DENSITY SOLUTIONS

(75) Inventors: Joseph F. Birdwell, Knoxville; John D. Randolph, Maryville; S. Paul Singh, Oak Ridge, all of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/291,861

(22) Filed: Apr. 14, 1999

(51) Int. Cl.[7] .................................................... B04B 11/02
(52) U.S. Cl. ................................. 494/22; 494/37; 494/56
(58) Field of Search ................................... 210/634, 787; 494/22, 37, 56, 57, 63, 65; 422/259

(56) References Cited

U.S. PATENT DOCUMENTS

| | | |
|---|---|---|
| 4,857,040 | * 8/1989 | Kashihara et al. . |
| 4,925,441 | 5/1990 | Jubin . |
| 5,024,647 | 6/1991 | Jubin et al. . |
| 5,093,254 | 3/1992 | Giuliano et al. . |
| 5,591,340 | * 1/1997 | Meikrantz et al. . |

OTHER PUBLICATIONS

Kirk–Othmer Encyclopedia of Chemical Technology, 4th Edition. vol. 10, John Wiley & Sons, pp. 125–180, Sep. 1995.*

\* cited by examiner

*Primary Examiner*—John Kim
*Assistant Examiner*—Richard W. Ward
(74) *Attorney, Agent, or Firm*—Akerman, Senterfitt & Eidson, P.A.

(57) ABSTRACT

Disclosed is a modified centrifugal contactor for separating solutions of near equal density. The modified contactor has a pressure differential establishing means that allows the application of a pressure differential across fluid in the rotor of the contactor. The pressure differential is such that it causes the boundary between solutions of near-equal density to shift, thereby facilitating separation of the phases. Also disclosed is a method of separating solutions of near-equal density.

13 Claims, 3 Drawing Sheets

METHOD FOR SOLVENT EXTRACTION WITH NEAR-EQUAL DENSITY SOLUTIONS

STATEMENT REGARDING FEDERALLY SPONSORED RESEARCH OR DEVELOPMENT

This invention was made as a result of work under Contract No. DE-AC05-96OR22464 between Oak Ridge National Laboratory, managed by Lockheed Martin Energy Research Corporation and the United States Department of Energy. The United States Government may have certain rights in this invention.

CROSS-REFERENCE TO RELATED APPLICATIONS

Not applicable.

BACKGROUND OF THE INVENTION

Purification processes such as distillation, chromatography, and liquid-liquid extraction are widely employed in the purification of chemical compounds. Distillation involves heating the components in a mixture, which may cause chemical degradation of the compound of interest. Chromatographic techniques are generally batch-type processes that are difficult to scale-up. Liquid—liquid extraction generally relies on selective transfer of solute between two immiscible solutions to accomplish purification of the transferring component. In most cases, immiscible solution pairs used in liquid-liquid extraction include one aqueous and one organic solution.

Traditional liquid-liquid extraction methods and apparatus require a significant density difference between solution pairs to achieve complete separation of the liquids and efficient recovery of transferring component(s). The use of this method of purifying components is complicated by the need to identify immiscible solution pairs between which the desired product component is transferred with a high degree of selectivity, and which can be easily separated once solute transfer is achieved. Selectivity refers to the property whereby the desired component is effectively transferred between immiscible solutions, whereas other components initially present in solution with the transferring component are not transferred.

Aqueous two phase partitioning (ATPP) liquid-liquid extraction systems have shown considerable potential for separation of some classes of compounds. Aqueous two phase partitioning systems are prepared by dissolving soluble polymers, such as polyethylene glycol (PEG) or dextran (DEX) in water. ATPP systems can also be formed by adding a soluble polymer and a soluble, low molecular weight compound (typically an inorganic salt) to water. When these types of chemicals are added to water in certain concentrations and are thoroughly dispersed by mixing or agitation, a turbid emulsion is formed which separates into two distinct liquid phases upon standing. Separation of the emulsion into two phases of differing composition results from incompatibilities between the water-soluble polymers or between a polymer and a salt. The difference in density between the two phases is typically very small. U.S. Pat. No. 4,579,661 discloses purification of a biologically active substance by extraction using at least two aqueous phases, one of which comprises an insoluble particle having affinity for the biologically active substance. U.S. Pat. No. 5,093,254 discloses an aqueous two-phase protein partitioning system that uses a ligand-polymer complex to enhance transfer of the biological material of interest to the phase comprising the complex. The two patent methods are examples of aqueous two phase partitioning systems of solutions of near equal density. Recently, ATPP systems have been applied for the recovery of 99m Technetium ($^{99m}$Tc). Other potential applications of ATPP systems include, but are not limited to, environmental restoration and waste management activities.

Despite the promise that ATPP systems hold for the purification of chemicals, application of such systems has been limited due to processing difficulties. Typically, density differences between solutions in ATPP systems are small, because the solutions consist primarily of water. Efficient transfer and recovery of components in liquid—liquid extraction processes requires the intimate mixing of the liquid phases to promote transfer of the component of interest, followed by complete separation of the mixture into its component liquid phases. Conventional extraction apparatus require relatively large volumes of working solutions, and are slow to reach mass transfer equilibrium. In addition, these apparatus generally rely on gravity settling for separation of the ATPP system dispersion.

Because solutions in ATPP systems have nearly equal densities, phase separations by gravity are slow and inefficient. Failure to obtain complete phase separation after transfer results in carryover of impurities into the product phase and retention of the component of interest in the waste phase. To overcome the phase separation problem, current ATPP applications employ separate equipment pieces for mixing and separation of the solution pairs. In one conventional process embodiment, the phases are mixed in one vessel to achieve transfer of the component of interest, and are then transferred by pumping to an apparatus that separates the dispersion by the application of centrifugal force. One or more holding vessels may be located between the mixing and separating apparatus to accommodate fluctuations in process parameters. Use of multiple steps and equipment pieces increases the overall cost of the purification operation, and increases the risk of introducing contaminants into the product stream.

Advanced centrifugal contactors have been disclosed that offer the advantages of increased recovery of desired material, high throughput, high mass transfer efficiency, rapid attainment of steady state, and a modular design that facilitates maintenance (U.S. Pat. Nos. 4,925,441 and 5,024,647). However, these contactors have been used exclusively for applications that employ extractions between organic and aqueous phases with large differences in phase density.

What is needed in the art is a means of improving the separation attainable between solutions of near equal density.

BRIEF SUMMARY OF THE INVENTION

One aspect of the present invention is a centrifugal contactor that facilitates separation of two solutions of near-equal density comprising a housing defining an elongated, vertically extended, substantially cylindrical cavity; a hollow cylindrical rotor disposed within the housing cavity, the rotor having a separator chamber defined by an upper surface, a lower surface and a substantially cylindrical wall, said lower surface having an opening therethrough, the interior wall of the housing and the exterior wall of the rotor defining a vertically extending annular zone in fluid communication with the opening in the bottom surface of the rotor, the rotor being operably connected to a drive means, the rotor having at least two vertically spaced outlet channels, and the rotor further comprising a means for establishing a pressure differential across fluid in the separator chamber; and at least one inlet means communicating with the housing and in registry with the annular zone for delivering solutions into the annular zone.

Another aspect of the invention is a method of separating two liquids comprising the steps of:

(a) providing a centrifugal contactor comprising a housing defining an elongated, vertically extended, cylindrical cavity; a hollow cylindrical rotor disposed within the housing cavity, the rotor having a separator chamber defined by an upper surface, a lower surface and a cylindrical wall, wherein said lower surface has an opening therethrough, and wherein the interior wall of the housing and the exterior wall of the rotor define a vertically extending annular zone in fluid communication with the opening in the bottom surface of the rotor, wherein the rotor is operably connected to a drive means, wherein the rotor has at least two vertically spaced outlet channels in the upper half of the rotor, and wherein the rotor is equipped with a means for establishing a pressure differential across the rotor; and at least one inlet means communicating with the housing and in registry with the annular zone for delivering solutions into the annular zone;

(b) delivering into the annular zone of the contactor of step (a) a solution comprising at least two liquids;

(c) allowing the solution of step (b) to transfer into the separator chamber of the rotor through the opening in the lower surface of the rotor;

(d) rotating the rotor to apply to the solution of step (c) a centrifugal force sufficient to cause the liquids to flow upward along the inner surface of the rotor separator;

(e) establishing a pressure differential across the separator while maintaining centrifugal force for a time sufficient to achieve substantially complete separation of the solution of step (d) into its component liquids.

In one embodiment, the present invention is a method of recovering at least one molecule from a first liquid into a second liquid having a density that is nearly equal to the density of the first liquid, comprising the steps of:

(a) providing a centrifugal contactor comprising a housing defining an elongated, vertically extended, cylindrical cavity; a hollow cylindrical rotor disposed within the housing cavity, the rotor having a separator chamber defined by an upper surface, a lower surface and a cylindrical wall, wherein said lower surface has an opening therethrough, and wherein the interior wall of the housing and the exterior wall of the rotor define a vertically extending annular zone in fluid communication with the opening in the bottom surface of the rotor, wherein the rotor is operably connected to a drive means, wherein the rotor has at least two vertically spaced outlet channels in the upper half of the rotor, and wherein the rotor is equipped with a means for establishing a pressure differential across the rotor; and at least one inlet means communicating with the housing and in registry with the annular zone for delivering solutions into the annular zone;

(b) delivering into the annular zone of the contactor of step (a) at least two solutions;

(c) rotating the rotor so as to apply to the solutions in the annular zone a shear force sufficient to create a dispersion of the solutions;

(d) allowing the dispersion of step (c) to transfer into the separator chamber of the rotor through the opening in the lower surface of the rotor;

(e) allowing the molecule to transfer from the first liquid to the second liquid;

(f) rotating the rotor to apply to the dispersion of step (d) a centrifugal force sufficient to cause the dispersion to flow upward along the inner surface of the separator chamber;

(g) establishing a pressure differential across the separator while maintaining centrifugal force at a speed sufficient and for a time sufficient to achieve substantially complete separation of the dispersion of step (e) into its different phases; and (h) collecting the separated phases.

It is an object of the present invention to provide an apparatus and method that allow the use of solvent pairs of near-equal density in liquid-liquid extractions.

It is an advantage of the present invention that the mixing and separating operations may be conducted in a single apparatus.

It is a feature of the present invention that the apparatus and method can be used in co-current, countercurrent, cross-current, or a combination of flow patterns in a multi-stage process. The feature provides process optimization by expanding the number of system configurations which can be applied.

Other objects, features, and advantages of the present invention will become apparent upon review of the specification and claims.

DETAILED DESCRIPTION OF THE INVENTION

The invention provides a method for separating liquids of near-equal density using a modified centrifugal contactor. Briefly, the principal difference between the modified contactor and unmodified contactors is that the contactor of the present invention is equipped with a means for creating a pressure differential between the inside of the rotor and the heavy phase solution outlet. The pressure difference is created so as to retard flow of liquid from the rotor, thereby increasing the residence time of solutions within the apparatus such that solutions of near equal densities can be separated efficiently. The pressure difference also results in a change in the location of the heavy/light phase interface within the rotor such that the interface is located between the heavy and light phase discharge flow channels. Location of the interface between these channels is key to preventing contamination of each exiting phase with the opposing phase.

Figures 1, 2, 3:
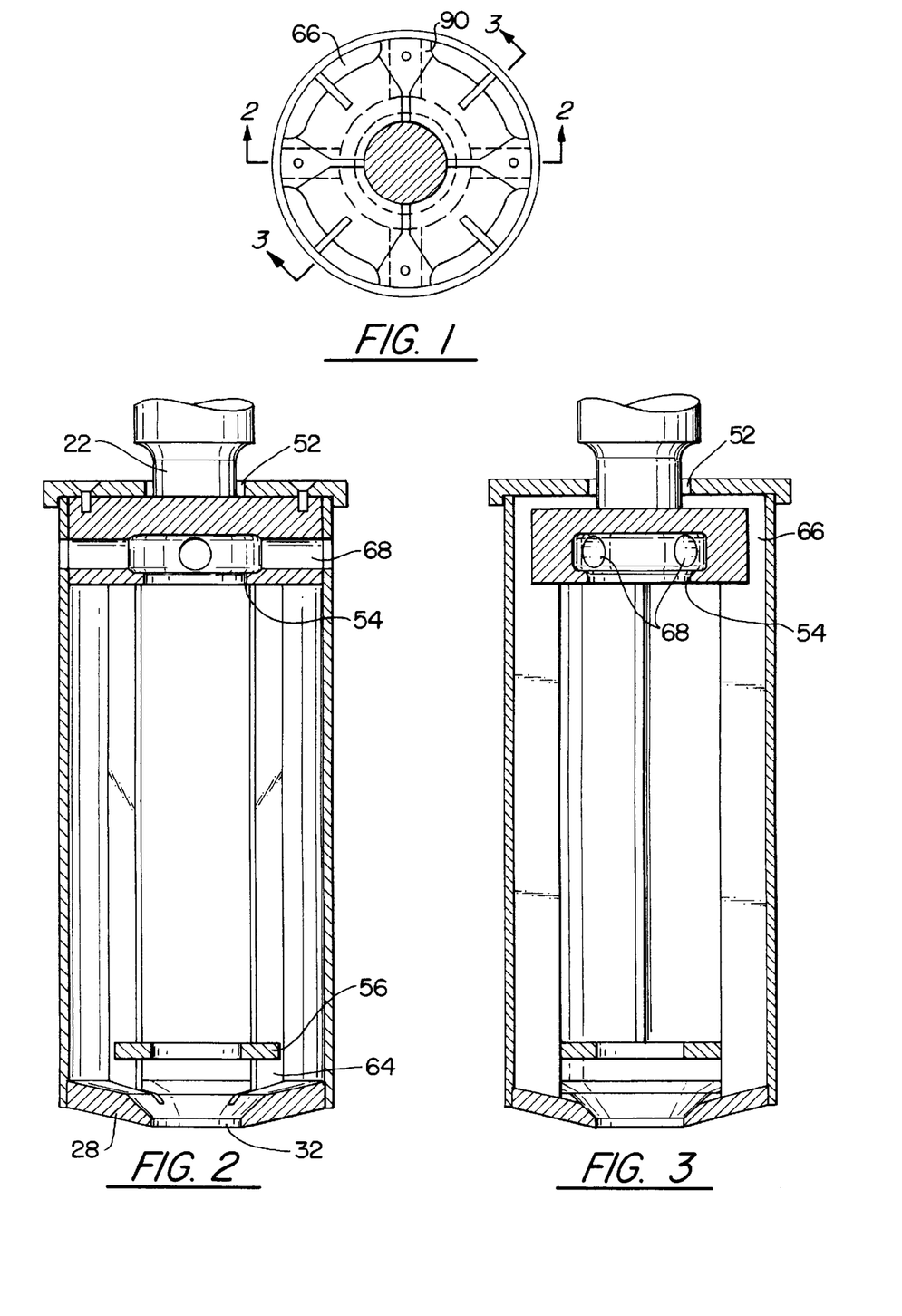
FIG. 1 is a horizontal cross section of a contactor rotor taken immediately below the heavy phase weir cap.
FIG. 2 is a vertical cross section of the contactor rotor, taken in the plane indicated by line 2—2 FIG. 1.
FIG. 3 is a second vertical cross section taken by intersecting the rotor with a plane as indicated by line 33 in FIG. 1.
Figure 4:
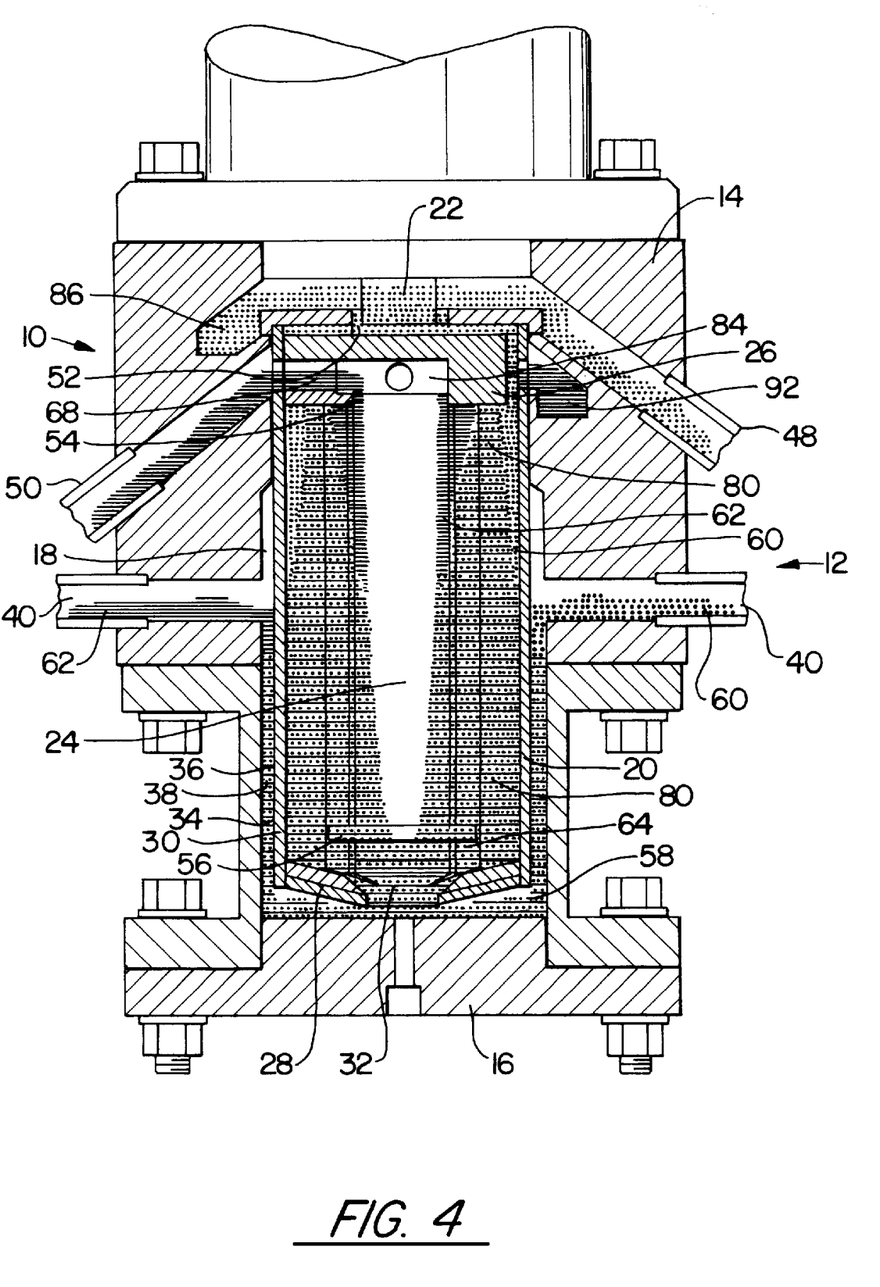
FIG. 4 illustrates the flow pattern of a dispersion of two phases and its constituent components.

With reference to FIGS. 2 and 4, the apparatus of the present invention is a centrifugal contactor 10 comprising a housing 12 having an upper surface 14 and a lower surface 16 and defining an elongated, vertically extended, substantially cylindrical cavity 18. A hollow, substantially cylindrical rotor 20 is disposed within the housing cavity, the rotor having a shaft 22 extending upwardly from the housing cavity through an opening in the upper surface of the housing. The rotor has a separator chamber 24 defined by an upper surface 26 positioned interior to and substantially parallel with the upper surface of the housing, a lower surface 28 and a substantially cylindrical wall 30. The lower surface of the separator chamber has an opening or rotor inlet 32 through which fluids can enter the separator chamber. The interior wall 34 of the housing 12 and the exterior wall 36 of the rotor 20 define a vertically extending annular zone 38 in fluid communication with the opening 32 in the bottom surface of the rotor. The centrifugal contactor has at least one inlet means 40 communicating with the housing and in registry with the annular zone 38 for delivering fluids into the annular zone. The upper portion or shaft 22 of the rotor extends upwardly from the housing and is operably connected to a drive means, which drives the rotation of the rotor.

Liquids to be separated are delivered into the annular zone 38 through the inlet 40. The liquids may be introduced separately or together as a single, combined stream. The flow of the heavy and light phases through the rotor is shown in FIG. 4. The flow paths can be better visualized and understood by referring to FIGS. 1, 2, and 3, as well. The feed solutions of the heavy phase 60 and the light phase 62 are thoroughly mixed in the annular zone 38 between the rotor and housing by means of shear forces produced by rotation of the rotor within the stationary housing. Mixing of the phases generates a dispersion 58, which flows from the annular region 38 into the rotor through an opening 32 at the bottom surface of the rotor.

Optionally, a dispersion disc 56 is provided to direct liquids toward the wall 30 of the separator chamber. The centrifugal force created by the rotation of the rotor causes the liquids to be forced outwardly toward the wall 30 of the separator chamber. Longitudinal vanes 64, positioned perpendicular to the interior portion of the separator wall, prevent slippage of liquid within the rotor, thereby promoting phase separation.

Following separation, liquids exit the rotor via vertically spaced outlet channels including a first outlet channel 48 adapted to receive the heavy phase and a second outlet channel 50 adapted to receive the light phase.

The centrifugal contactor of the present invention is equipped with a means for establishing a pressure differential across fluid in the rotor. In one embodiment, the pressure differential establishing means is a partial mechanical flow impediment, such as a combination of a heavy phase weir 52 and a light phase weir 54 having a heavy:light phase weir radius ratio of at most about 1.0. FIG. 1 shows a horizontal cross section of a contactor rotor taken just below the heavy phase weir cap, and viewed from above. Heavy phase underflows 66 appear as gaps located just immediately interior to the inner diameter of the rotor wall. The contactor depicted in FIG. 1 has four underflows positioned 90° apart, with vanes 90 positioned between the underflows and extending radially inward from the inner circumference of the rotor wall at 90° intervals. The vanes 90 direct the liquid from the heavy phase underflow 66 to the heavy phase weir 52.

With reference to FIG. 4, the liquids form a dispersion band 80 upon entering the separator. Immediately after entering the separator, there is virtually no separation between the liquids, and the dispersion band is relatively wide. As the solutions flow upward through the rotor, the applied centrifugal force causes the dispersion to separate into its component higher density 60 (heavy phase) and lower density 62 (light phase) solutions, and the dispersion band 80 becomes progressively narrower toward the top of the separator chamber. By virtue of a density difference, the heavy phase 60 moves toward the rotor wall as it separates from the dispersion while the lighter phase 62 forms a layer located radially inward from the heavy phase. The light phase accumulates within the separator chamber and the thickness of the light phase increases until the layer extends radially inward to the light phase weir 54 and the light phase flows upward over the light phase weir and into a collection reservoir 84. The light phase exits this collection chamber via light phase channels 68 that extend outward to the outer diameter of the rotor wall. Commonly, the light phase is discharged from the rotor into a circular trough 92 that has been machined into the inner wall of the housing at approximately the elevation of the light phase channels 68.

The heavy phase moves upward past the light phase collection chamber and light phase channels via underflows 66. The heavy phase underflows are openings located between areas of solid material (metal, etc.), inside which the light phase channels have been placed. After flowing upward past the light phase channels, the heavy phase is directed inward toward the rotor axis. The heavy phase flows inward toward the rotor until it reaches the heavy phase weir 52. The heavy phase solution flows upward over the weir, and then flows outward from the rotor to be collected in a trough 86 in the inner wall of the housing, which is positioned above the light phase collection trough.

Figure 5:
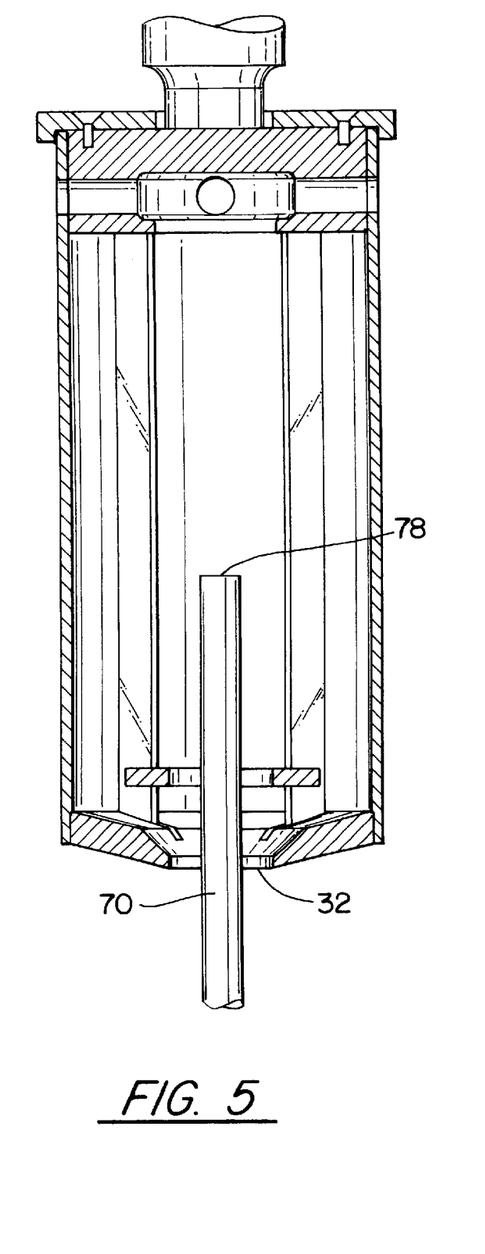
FIG. 5 shows a contactor equipped with a means for establishing a vacuum within the separator chamber.

In another embodiment, a pressure differential means acts by creating a partial vacuum within the rotor. A centrifugal contactor equipped with a means for creating a partial vacuum within the contactor is shown in FIG. 5. The contactor comprises a length of substantially cylindrical, hollow tubing 70. The tubing 70 has a first end 78 that is disposed within, and preferably substantially coaxial with, the separator chamber. The tubing 70 has a middle portion that spans the interior and exterior of the rotor at the opening to the separator chamber 32. The tubing has a second end, positioned exterior to the separator chamber, which can be joined to a vacuum source.

Figure 6:
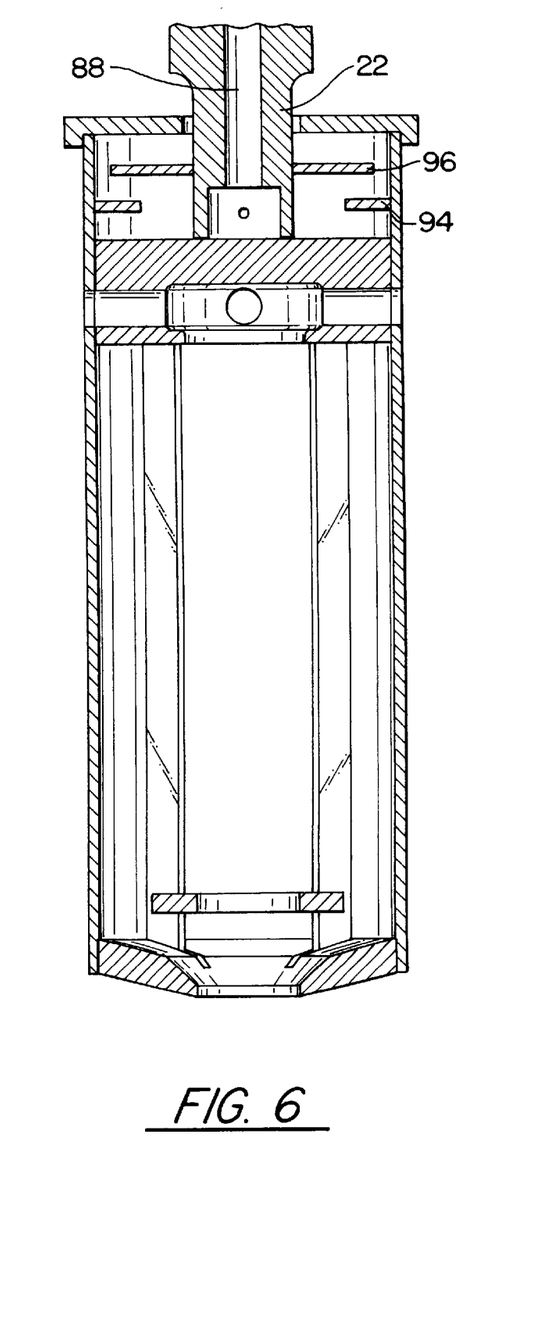
FIG. 6 shows a contactor equipped with a means for pressurizing the heavy phase outlet.

Another means by which a pressure differential could be established is through controlled pressurization of the heavy phase solution outlet. The contactor shown in FIG. 6 has a shaft 22 having a substantially cylindrical, vertically extending, coaxial bore 88 formed therethrough. The bore is connected to a pressurized gas source external to the rotor 20 for delivering gas over the heavy phase solution underflow 66 such that flow of the heavy phase is impeded. Additionally, the contactor of the embodiment depicted in FIG. 6 has a lower disc 94, which is substantially coaxial with the rotor axis of rotation, positioned above and substantially parallel with the light phase channel, and attached at its circumference to the inner wall of the rotor. The lower disc 94 has a substantially circular opening therethrough that is substantially concentric with the disc 94. An upper disc 96 positioned above the lower disc 94 is substantially coaxial with the rotor axis of rotation, is attached to the rotor shaft, and has a diameter that is smaller than the inner diameter of the rotor and larger than the diameter of the circular opening formed within the lower disc 94. In combination, discs 94 and 96 comprise a gas weir which results in the formation of a liquid seal comprising the heavy solution phase. This seal forms above the lower disc 94 and extends from the inner wall of the rotor inward toward the upper disc 96. The seal facilitates application of pressure over the heavy phase underflow by preventing the venting of the gas stream through the heavy phase weir.

During the phase separation process, the pressure differential establishing means creates and preferably controls a pressure differential across the solutions. By a pressure differential, it is meant a force that is applied to the solutions in the contactor during centrifugation that causes a shift in the position of the interface or phase boundary between the two phases relative to the position of the interface in a similar contactor lacking the pressure differential means and operated under the same conditions. Preferably, the pressure differential causes a shift in the interface away from the periphery of the rotor, defined by the wall 30, and radially inward toward the center axis of the rotor so as to permit enhanced separation of the dispersion within the rotor.

The separated solutions are directed through separate outlet channels located in the rotor, and are transferred by the rotation of the rotor into collection chambers in the vessel from which they are continuously withdrawn.

Prior to the present invention, the performance of centrifugal contactors without the addition of pressure differential creating means was evaluated with respect to ATPP systems applications to determine whether the advantages offered by contactors could be realized for systems of solutions having nearly equal densities. Results of the evaluation indicate that unmodified contactors are not suitable for separating solutions of near equal density because significant phase separation performance can be achieved only at very low throughputs and at precisely controlled speeds.

Poor phase separation, as evidenced by cross-phase contamination in one or both existing solutions, can result from the existence of an annular band of material, which consists of one phase dispersed in the other phase (a so-called dispersion band). Cross phase contamination is observed when this band a) extends radially inward within the rotor to a point below the light phase weir, b) extends radially outward to a point below the heavy phase underflow, or c) extends from a point below the heavy phase underflow to a point below the light phase weir. In case a), contamination is indicated in the lower density solution effluent only. In case b), contamination is found in the higher density solution effluent only. In case c) contamination is indicated in both effluent solutions. Poor phase separation also results when the boundary between light and heavy phases is located below either the light phase weir or the heavy phase underflow.

Phase separation can sometimes be enhanced by increasing the rotor speed or decreasing the flow rate. However, increasing the rotational speed may also result in greater cross-contamination between phases by causing the radial position of the dispersion band (if one exists) or the phase boundary, to shift outward such that both phases flow through the heavy phase underflow and out the heavy phase weir. To achieve acceptable phase separation and to minimize cross-contamination between phases when existing (unmodified) contactors are used with ATPP systems, it is necessary to centrifuge for an extended period of time at low rotational speeds and at extremely reduced flow rates. Slight variations in flow under these conditions have been determined to result in unacceptable process performance. In addition, the low-speed/low-throughput mode of operation generates purified product materials at very low rates, thereby making the process economically unfeasible due to the difficulty in recovering the capital investment in processing equipment.

A centrifugal contactor was modified by equipping it with a pressure differential establishing means and evaluated to determine whether increased throughput, decreased residence time, and acceptable phase separation could be obtained using an ATPP system. A modified contactor according to the invention comprises a pressure differential establishing means, which, during operation of the contactor, creates a pressure differential across the separator. The pressure differential causes the boundary or interface between the phases to shift, relative to the position of the interface in an unmodified contactor. This shift occurs away from the periphery of the rotor, and toward the apparatus' axis of rotation. The modified contactor is operable at increased rotational speeds (thereby increasing throughput and reducing residence time) without experiencing problems which would lead to cross-contamination between phases. The shift in the interface toward the axis of rotation gives improved phase separation and recovery at greatly increased solution throughput values. As described in the examples, the modified contactor achieved separation of near equal density solutions with the cross-contamination reduced at least about 10-fold and throughput increased at least about 25-fold, relative to an unmodified contactor.

One of ordinary skill in the art will appreciate that any suitable means for creating a pressure differential could be used in the centrifugal contactor of the present invention. In one embodiment, the present invention is a conventional contactor equipped with a means for imposing a pressurized gas over the fluid outlet to establish a pressure differential across the separator. In another embodiment, the rotor is equipped with a means for establishing a vacuum within the separator chamber by partially evacuating gas from the void space formed during operation of the centrifuge and coincident with the central axis of the separator chamber. A partial vacuum could be accomplished by means of a bayonet introduced through the lower surface of the separator and attached to a vacuum source. In yet another embodiment, the pressure differential is established by means of a partial mechanical flow impediment.

The examples below describe a centrifugal contactor equipped with a mechanical flow impediment that restricts or reduces the radius of the heavy phase weir. Existing, unmodified centrifugal contactors that are used to separate liquids with different densities have heavy and light phase weirs, with the radius of the heavy phase weir exceeding that of the light phase weir. Typically, the ratio of the heavy phase weir radius to the light phase weir radius is approximately 1.2. A smaller heavy:light phase weir radius ratio allows separation of solutions having less difference in their densities. In a contactor in which the weir ratios are modified to allow separation of solutions of near-equal density, the heavy:light phase weir ratio should be less than about 1.0. This ratio is preferably between about 0.7 and 1.0.

As the examples below demonstrate, decreasing the heavy phase weir radius results in an increased pressure drop across the weir, and makes it possible to increase the rotational speed of the separator without concomitantly shifting the phase boundary outward to a position below the heavy phase underflow. Shifting of the phase boundary toward the heavy phase underflow results in transport of both light and heavy phases through the underflow across the heavy phase weir, and out of the separator as a single, mixed stream. Operation of the separator at higher speeds provides more efficient separation of the dispersion entering the contactor rotor and facilitates processing of material at higher throughputs.

The method of the present invention can be employed using any solvent pair of near equal density, as long as the solutions are immiscible or substantially immiscible. Numerous aqueous solvent pairs are known to the art (e.g., see Diamond and Hsu, *Advances in Biochemical Engineering* 47:89–135, 1992). It is envisioned that the present invention may be successfully employed using any two suitable aqueous or nonaqueous solutions having near-equal densities.

By "near-equal density solutions" as used herein, it is meant a solution pair in which the ratio of the heavy phase density to the light phase density falls in the range of 1.0 to 1.08. It may be possible to separate some, but not all, solution pairs having density ratios approaching 1.08 in an unmodified centrifugal contactor. Results obtained during development of the invention proved that unmodified contactors do not provide adequate phase separation as the density ratio decreases below a value of 1.08. As the examples below demonstrate, the method of the present invention provided good separation of solutions having a density ratio of approximately 1.06. It is reasonably expected that the present invention achieve effective separation of solutions having heavy to light phase density ratios as low as 1.01.

The following nonlimiting examples are intended to be purely illustrative.

EXAMPLES

An unmodified centrifugal contactor and a centrifugal contactor modified to include a pressure differential establishing means were evaluated for their abilities to perform aqueous two phase partitioning, as described below.

Preparation of aqueous solutions

An aqueous mixture containing approximately 7–8% (wt %) each of polyethylene glycol (average molecular weight= 3350) and Dextran T-500 (Pharmacia Biotech, Upsala, Sweden) was prepared. The formulation was blended using a mechanical stirring device to promote dissolution of the polymers. After the polymers were dissolved, the mixture was allowed to stand to ensure that the formulation would separate into two distinct liquid phases.

Evaluation of unmodified contactor

The hydraulic capacity of a centrifugal contactor with a separator having an outer diameter of 55 mm was determined for the formulation described above. The housing of the contactor was fabricated from transparent materials to facilitate visual observation of the solution in the mixing zone and discharge of the phases from the separator into the collector rings. A feed solution of 7–8% PEG and 7–8% dextran, prepared as described above, was placed in a feed storage vessel, constructed of a nonreactive material, from which it was pumped into the centrifugal contactor. The solution in the feed vessel was continuously stirred during testing to prevent separation prior to introduction into the centrifugal contactor.

The hydraulic capacity of the centrifugal contactor was measured as follows. The rotational speed of the rotor was set at a predetermined value, after which the flow of the PEG/DEX dispersion was initiated. After steady flows were observed coming out of both the heavy and light phase discharge ports, samples of both effluent solutions were collected. Each sample was processed in a laboratory centrifuge to achieve complete phase separation. The degree of phase separation in each sample was determined by measuring the volume of each phase present in each sample after centrifuging. The hydraulic capacity performance was expressed as the ratio of the light phase volume to the heavy phase volume found in each sample. High ratio values in the light phase effluent samples and low ratio values the heavy phase effluent samples indicate better separation performance. To determine the range of rotor speeds for achieving minimal phase cross-contamination, the rotor speed was either increased or decreased and the hydraulic capacity measured until cross-contamination in each effluent stream was minimized.

The data obtained indicate that the operating range of the unmodified centrifugal contactor is very limited for the PEG/DEX ATPP system. The best phase separation for the system studied was achieved at a rotor speed of approximately 1250 rpm and flow rate of approximately 20 ml/min. With solutions having greater density differences than the PEG/DEX ATPP system (e.g., aqueous/organic systems), a total throughput of approximately 2 L/min at a rotor speed of 4000 rpm is typically obtained using the unmodified contactor. The reduction in throughput for the ATPP system is due to the relatively small density difference between the phases.

Solute transfer efficiency in an ATPP system was determined by measuring the transfer of bromophenol blue dye from the DEX phase to the PEG phase. The DEX-phase solution contained bromophenol blue at a concentration of 2% (by volume). Selection of dye concentration value for the feed solution was based on requirements for analysis using a ultraviolet/visible spectrophotometer. The separator speed and total flow used in the mass transfer tests were those that produced the least cross-phase contamination in the hydraulic tests.

Mass transfer testing was performed by establishing rotor speed at 1200 rpm, introducing the higher density (DEX) solution feed and initiating the flow of the lower density (PEG) solution after solution was observed to exit the heavy phase contactor outlet. Each feed solution was supplied to the contactor at a flow rate of 8 ml/min. As soon as the flow was observed exiting both the light and heavy phase outlet, the flow rates of both effluent streams were determined by collecting each stream in graduated cylinders for a fixed period of time. The system was permitted to operate at steady flow and speed conditions for one hour, at which time samples of the effluent solutions were collected. Three samples were collected from each exit stream and from the DEX feed solution. Bromophenol blue concentrations in all samples were determined by spectrophotometry at a single wavelength of 591 nanometers. The PEG-phase feed stream was not sampled or analyzed as it was dye-free.

Mass transfer performance has been quantified in terms of transfer stage efficiency, which has been determined according to the equation:

$$\text{Stage efficiency} = \frac{C_{DEXin} - C_{DEXout}}{C_{DEXin} - C^*_{DEXout}} \times 100$$

where $C_{DEXin}$ is the concentration of the dye in the inlet dextran stream;

$C_{DEXout}$=Concentration of the dye in the outlet dextran stream; and $C^*_{DEXout}$=Concentration of the dye in the outlet dextran stream at the equilibrium condition.

The equilibrium concentration of the dye in the dextran phase was determined by mixing samples collected from the contactor effluent streams for two hours, separating the phases by centrifugation, and determining the dye concentration in the dextran phase by the method described previously.

The stage efficiency, based on triplicate samples from a single mass transfer test, ranged from 80–85%. This is comparable to stage efficiencies using unmodified centrifugal contactors in the application for which they were designed, i.e., the recovery of actinide elements from spent nuclear reactor fuel. Stage efficiencies obtained in this application typically range from 80 to 95%.

Development and Performance Testing of Modified Contactor

A modified centrifugal contactor having a means for creating a pressure differential was developed. A heavy phase weir cap having a weir radius of about 10.16 mm (0.4 in) was fabricated and installed on a 55-mm diameter centrifugal contactor rotor. The ratio of the radius of the heavy phase weir to the radius of the light phase weir was approximately 0.97.

The modified contactor was tested using 7% (by weight) dextran 7% (by weight) PEG. The formulation was continuously stirred during testing to prevent phase separation and was supplied as the single feed stream to the modified contactor, which was operated at 1200 rpm. The feed stream flow rate was 464 ml/min, which was confirmed by timed collection of the full feed stream. The rotor speed was adjusted until good phase separation was obtained, as determined by periodic sampling and measuring the cross-phase contamination in the effluent streams. Acceptable phase separation, defined as not more than 1% (by volume) cross-phase contamination, was achieved at a contactor speed of approximately 2900 rpm.

A second test was performed to determine whether an increase in rotor speed would result in additional performance improvement. Using the modified contactor, a total throughput increased to 500 ml/min at a rotor speed of approximately 3500 rpm with approximately 13% cross-phase contamination in each effluent stream was achieved.

The results of testing conducted as described in the Examples above indicate that by modifying a conventional centrifugal contactor to include a pressure differential establishing means, the throughput and the rotor speed can be increased without increasing cross-phase contamination between solutions of near-equal densities.

One skilled in the art will appreciate that optimization of throughput, residence time, and cross-contamination for any ATPP system will depend on a variety of factors. The extent to which these parameters can be varied to achieve optimum performance is determined, in part, by the level of cross-contamination which is deemed acceptable for a particular application.

Purification of molecules using an ATPP system and the contactor of the present invention offers the advantage of allowing the extraction, separation, and recovery steps to be conducted in a single, modular unit. However, it should be appreciated that the phases may be mixed prior to delivering them into the contactor.

In the examples above, the pressure differential was established by means of a mechanical flow impediment at the liquid discharge point from the rotor of the modified centrifugal contactor. Specifically, the centrifugal contactor, which was fitted with a weir, was modified by decreasing the size of the opening in the heavy phase weir so as to impede the flow of solution out of the rotor. It is specifically envisioned that the apparatus may be modified to include controlled mechanical flow impediments other than a heavy phase weir having a relatively small diameter. For example, one could create a mechanical flow impediment by narrowing the heavy phase overflow, or by modifying the sleeve on the shaft to reduce the opening to the outlet.

It is envisioned that the method of the present invention can be used to advantage by employing several contactors linked in any one of several multiple phase flow patterns, including co-current flow, crosscurrent flow, countercurrent flow, or any combination thereof.

It is envisioned that the present invention can be used in the purification of desired products from a solution, as well as in the removal of undesirable materials, or for any other application that could be facilitated by separation of phases of near-equal density. One of skill in the art would appreciate that any number of solutes could be removed/extracted by the present invention, depending on the solvent pair chosen.

The method and apparatus of the present invention significantly increase the number of chemical separations which can be achieved by liquid-liquid extraction by mitigating the requirement for solution pairs having widely disparate densities. This method allows purification of components by liquid-liquid extraction between pairs of immiscible solutions having densities which differ by as little as two percent.

One area in which the method could expand the use of liquid-liquid extraction operations is in the purification of components by transfer between pairs of immiscible, aqueous solutions. The ability to achieve transfer in an all-aqueous system permits processing of compounds, particularly biomolecules, which are denatured by organic solvents. Use of all-aqueous systems in separation processes also reduces the generation of organic solvent waste, disposal of which is typically expensive and problematic due to regulatory constraints.

All publications cited in the specification are incorporated by reference.

The present invention is not limited to the exemplified embodiments, but is intended to encompass all such modifications and variations as come within the scope of the following claims.

What is claimed is:

1. A method for separating a first fluid and a second fluid of near-equal density using a centrifugal contactor, said contactor comprising a hollow rotor, said rotor having an inner and outer wall, comprising the steps of:
   (a) flowing said fluids into a separator chamber of the rotor formed within a volume defined by said inner wall of said rotor and a height of said rotor, said separator chamber having an inner weir and an outer weir, each said weir defining at least one opening having an outer edge, said outer weir edge positioned radially outward of said inner weir edge;
   (b) rotating the rotor at a speed sufficient to cause said fluids to flow upward along the inner surface of the separator chamber, wherein said fluids separate as they move upward, wherein a less dense fluid of said fluids forms a layer radially inward from a more dense fluid of said fluids;
   (c) directing said less dense fluid to said outer weir opening; and
   (d) directing said more dense fluid to said inner weir opening.

2. The method of claim 1, wherein the fluids have a dense fluid to less dense fluid density ratio of less than 1.06.

3. The method of claim 1, wherein said more dense fluid underflows said outer weir.

4. The method of claim 1, further comprising the step of mixing said fluids.

5. The method of claim 4, wherein said fluids are substantially mixed prior to flowing said fluids into said separator chamber.

6. The method of claim 5, wherein said first fluid initially contains at least one extraction component, and at least a portion of said at least one extraction component is transferred from said first fluid to said second fluid.

7. The method of claim 4, wherein said fluids are substantially mixed inside said contactor.

8. The method of claim 7, wherein said contactor further comprises a housing surrounding said rotor, wherein an annular zone is created between said rotor outer wall and said housing, wherein said fluids flowed into said annular zone and are substantially mixed in said annular zone to generate a dispersion of said fluids.

9. The method of claim 8, wherein said first fluid initially contains at least one extraction component, and during said mixing step at least a portion of said at least one extraction component is transferred from said first fluid to said second fluid.

10. The method of claim 1, wherein said first fluid initially contains at least one extraction component, and at least a portion of said at least one extraction component is transferred from said first fluid to said second fluid.

11. The method of claim 1, further comprising the step of modifying a pressure differential across said separator produced by rotation of said rotor.

12. The method of claim 11, wherein said modifying a pressure differential across said separator is produced by at least one selected from the group consisting of imposing a pressurized gas over said inner weir, establishing a partial vacuum within said separator chamber, and applying a partial mechanical flow impediment to said inner weir.

13. The method of claim 1, wherein said outer weir opening has a first maximum radius and said inner weir opening has a second maximum radius, the ratio of said first radius to said second radius being greater than or equal to 0.7 and less than 1.0.

* * * * *